United States Patent [19]
Yeaton

[11] Patent Number: 5,744,781
[45] Date of Patent: Apr. 28, 1998

[54] METHOD AND APPARATUS FOR LASER SHOCK PEENING

[75] Inventor: Robert L. Yeaton, Cincinnati, Ohio

[73] Assignee: General Electric Company, Cincinnati, Ohio

[21] Appl. No.: 511,771

[22] Filed: Aug. 7, 1995

[51] Int. Cl.$^6$ .................................................. B23K 26/14
[52] U.S. Cl. ........................................................ 219/121.84
[58] Field of Search ........................ 219/121.73, 121.85, 219/121.84; 148/525, 565

[56] References Cited

U.S. PATENT DOCUMENTS

| | | |
|---|---|---|
| 3,689,176 | 9/1972 | Howell et al. |
| 3,850,698 | 11/1974 | Mallozzi et al. |
| 4,002,403 | 1/1977 | Mallozzi et al. |
| 4,060,769 | 11/1977 | Mallozzi et al. |
| 4,401,477 | 8/1983 | Clauer et al. |
| 4,426,867 | 1/1984 | Neal et al. ............................... 72/53 |
| 4,937,421 | 6/1990 | Ortiz, Jr. |
| 5,127,019 | 6/1992 | Epstein et al. |
| 5,131,957 | 7/1992 | Epstein et al. |
| 5,226,785 | 7/1993 | Narayana et al. |
| 5,306,360 | 4/1994 | Bharti et al. |
| 5,307,622 | 5/1994 | Ciokajlo et al. |
| 5,620,307 | 4/1997 | Mannava et al. ...................... 219/121.68 |

FOREIGN PATENT DOCUMENTS

| | | |
|---|---|---|
| 85278 | 8/1983 | European Pat. Off. |
| 416988 | 3/1991 | European Pat. Off. ........ 219/121.73 |

OTHER PUBLICATIONS

"Laser shocking extends fatigue life", by John A. Vaccari, American Machinist, Jul., 1992.
"Effects Of Laser Induced Shock Waves On Metals", by Clauer, Holbrook and Fairans, Chapter 38, pgs. 675–702.
"Laser Shock Processing Increases the Fatigue Life of Metal Parts", Materials and Processing Report, Sep., 1991, pp. 3–5.
Translation of EP416,988, Jan. 1997, PTO–97–1466.

*Primary Examiner*—Geoffrey S. Evans
*Attorney, Agent, or Firm*—Andrew C. Hess; Nathan D. Herkamp

[57] ABSTRACT

A method and apparatus for laser shock peening a portion of a surface on a workpiece with a laser beam directed through a curtain of water confined to the surface by a confining device that confines the water curtain on the surface essentially without any air gaps between the surface and a transparent wall of the confining device. The confining device may also incorporate a back pressure mechanism for producing a back pressure in the curtain of water over the surface such as a nozzle shaped portion of the transparent wall through which the continuous water curtain is introduced by a water nozzle. Automated mechanisms such as robotic arms may be used for positioning the confining wall a predetermined distance away from the surface portion and optionally a water supply nozzle to provide the curtain of water over the surface.

20 Claims, 4 Drawing Sheets

METHOD AND APPARATUS FOR LASER SHOCK PEENING

RELATED PATENT APPLICATIONS

The present Application deals with related subject matter in co-pending U.S. patent Ser. No. 08/319,346, entitled "LASER SHOCK PEENED ROTOR COMPONENTS FOR TURBOMACHINERY"; Ser. No. 08/373,133, entitled "LASER SHOCK PEENED GAS TURBINE ENGINE FAN BLADE EDGES"; Ser. No. 08/362,362, entitled "ON THE FLY LASER SHOCK PEENING"; and Ser. No. 08/399,285, entitled "LASER SHOCK PEENED GAS TURBINE ENGINE COMPRESSOR AIRFOIL EDGES".

BACKGROUND OF THE INVENTION

1. Field of the Invention

This invention relates to apparatus for laser shock peening processes and, more particularly, to apparatus for maintaining control of the water curtain flowed over the laser shocked area of the workpiece during a laser shock peening process.

2. Description of Related Art

Laser shock peening or laser shock processing as it also referred to is a process for producing a region of deep compressive residual stresses imparted by laser shock peening a surface area of a workpiece. Laser shock peening typically uses multiple radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening as understood in the art and as used herein, produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". At least some of these methods typically employ a curtain of water flowed over the workpiece. The curtain of water provides a confining medium, to confine and redirect the process generated shock waves into the bulk of the material of a component being LSP'D, to create the beneficial compressive residual stresses. This confining medium also serves as a carrier to remove process generated debris and any unused laser beam energy. Water is an ideal confining medium since it is transparent to the ND:YAG beam wavelength and is easy to implement in production. The water curtain should be kept in continuous contact with an essentially zero gap between the surface of the workpiece or part being LSP'D and the water. The water curtain often must be kept at a depth greater than 1 mm. Many surface tension effects and part geometry make it difficult to maintain an essentially zero gap and the desired depth, resulting in the loss of the expected LSP effect.

SUMMARY OF THE INVENTION

A method and apparatus for laser shock peening a surface portion on a workpiece through a curtain of water. The apparatus includes a laser unit having a laser beam source for generating at least one laser beam and apparatus for directing the beam through to the surface portion on the workpiece, a water supply apparatus to flow the curtain of water over the surface portion, and a confining device to confine the water curtain on the surface portion essentially without any air gaps between the surface portion and a transparent wall of the confining device, and apparatus to position the transparent wall a spaced apart distance from and over the surface portion. The apparatus the confining device may also incorporate a back pressure mechanism for producing a back pressure in the curtain of water over the surface portion. One embodiment provides a nozzle shaped wall as the back pressure mechanism which may be used together with the transparent wall as integral sections of a continuous water curtain confining wall. Another embodiment of the present invention further includes automated mechanisms such as robotic arms for positioning the confining wall a predetermined distance away from the surface portion and optionally a water supply nozzle to provide the curtain of water over the surface portion.

A more particular embodiment of the apparatus provides the laser unit and the laser beam source which are operable to generate and transmit two laser beams and has transmission apparatus for directing each of the beams to an opposite one of two opposite sides of the workpiece and each beam through a curtain of water onto a surface portion on each side of the workpiece. It also has water supply apparatus to flow the curtain of water over each surface portion and two confining mechanisms to confine each water curtain on each surface portion essentially without any air gaps between the surface portions and the transparent walls of said confining mechanisms wherein the transparent walls are positionable a spaced apart distance from and over each respective surface portion such that each surface portion can be simultaneously laser shock peened.

ADVANTAGES

Among the advantages provided by the present invention is the improved ability to laser shock peen metal parts with a greater degree of effectiveness and consistency than that of the prior art. The present invention provides a constant and controllable thickness of the curtain of water or other fluid for the laser shock peening process.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
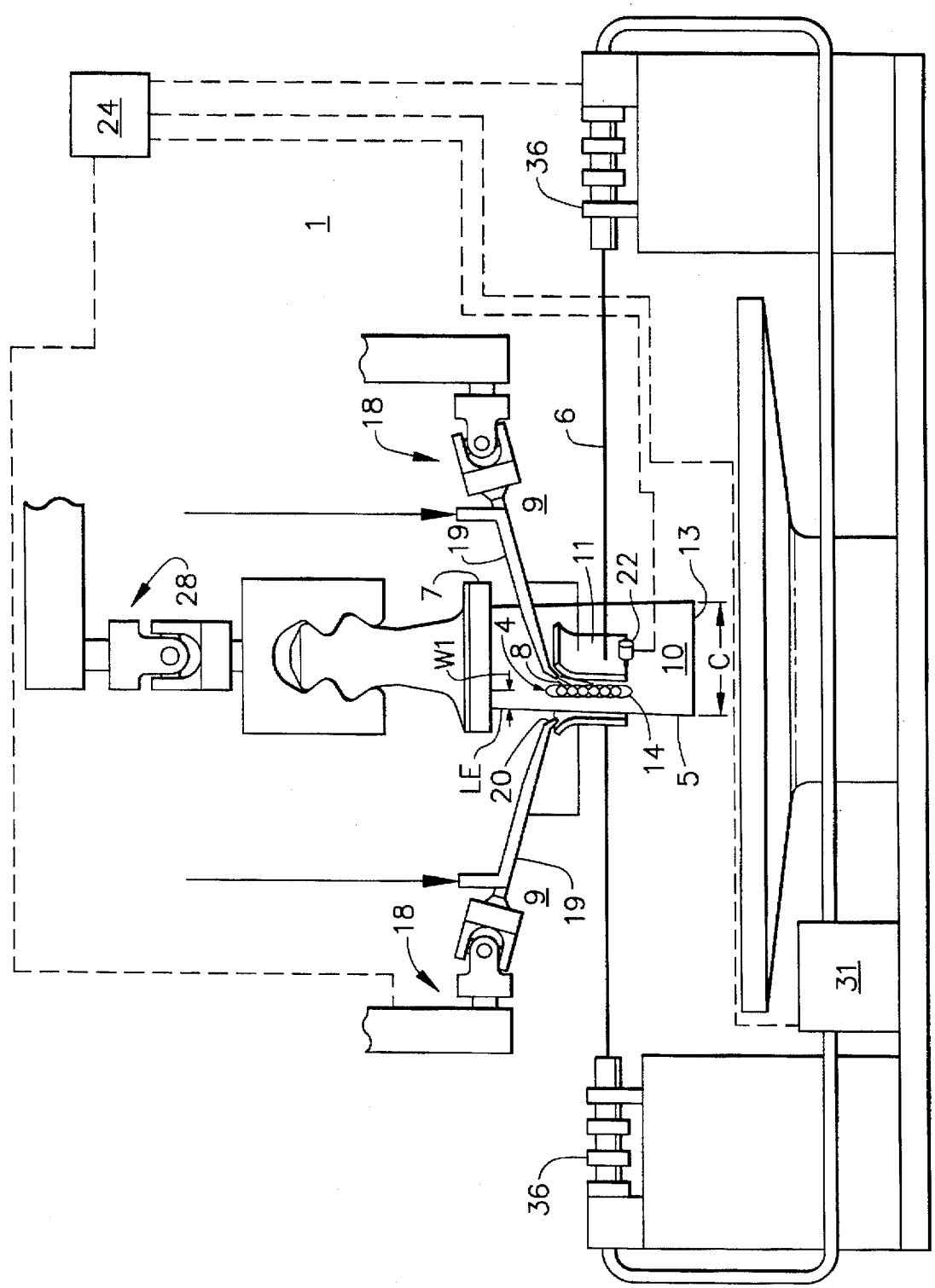
FIG. 1 is a partial perspective schematic illustration of a laser shock peening apparatus and method in accordance with a first exemplary embodiment of the present invention.
Figure 2:
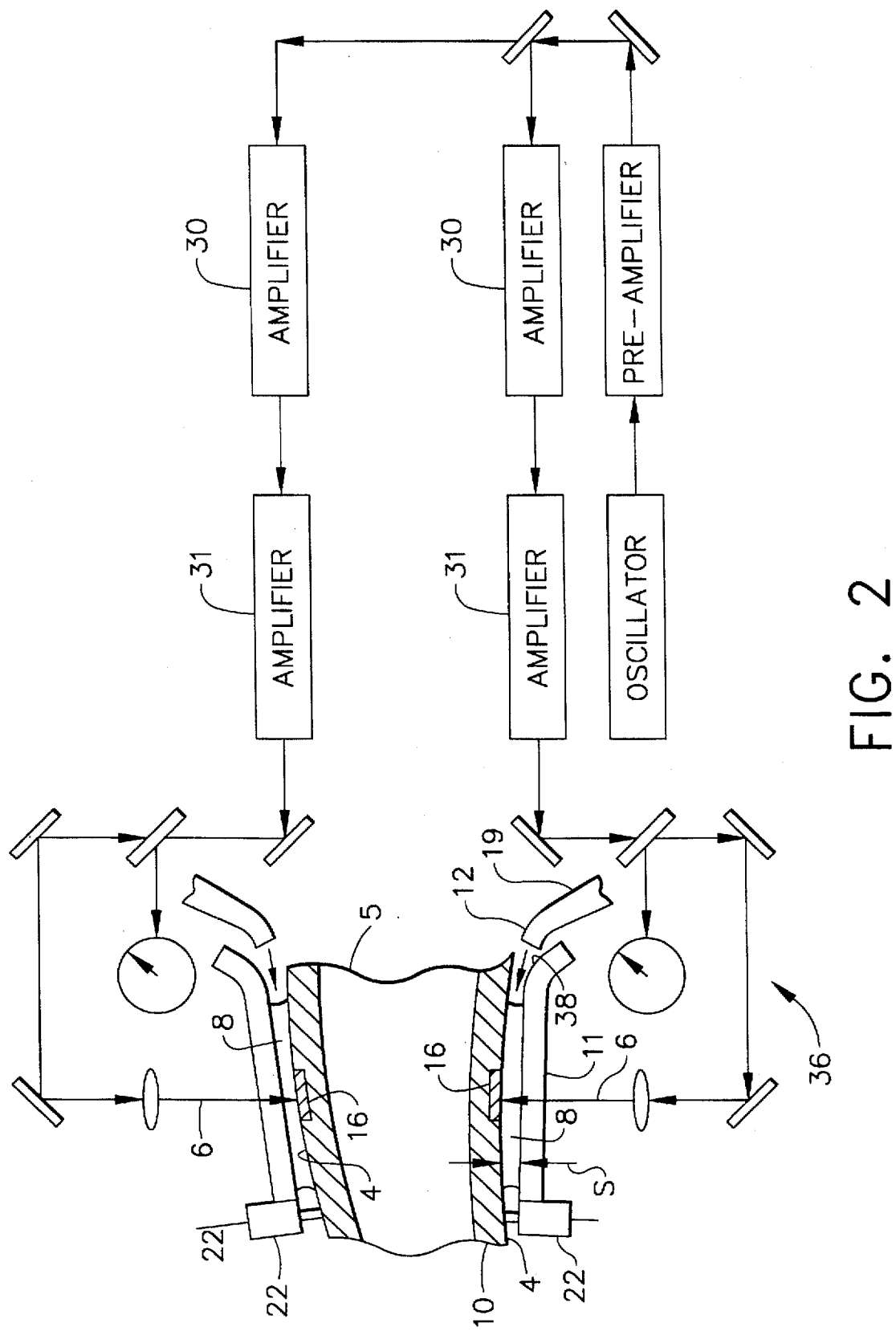
FIG. 2 is an enlarged partially diagrammatic and partially schematic illustration of the laser shock peening apparatus and method illustrated in FIG. 1.

Illustrated in FIGS. 1 and 2 is an apparatus generally shown at 1 for laser shock peening a portion of a surface 4, on a workpiece exemplified herein as a rotor blade 5, with a laser beam 6 through a curtain of water 8, held against the surface 4 by a confining means, generally indicated at 9, to confine the water curtain on the surface essentially without any air gaps between the surface and a transparent wall 11 of the confining means. The portion a surface 4 is a leading edge LE of an airfoil 10 which extends radially between a platform 7 and a tip 13 of the rotor blade 5 and having a chordlength C. The apparatus and method of the present invention produces laser beam shocked surfaces, such as the surface 4, with laser beam induced shock waves generally indicated by overlapping laser shock peened circular spots 14 and, therefore, are referred to as laser beam shocked surfaces. A pre-stressed region 16 having deep compressive residual stresses imparted by laser shock peening (LSP) extends into the airfoil 10 from the laser shock peened surface 4 as seen in FIG. 1. The transparent wall 11 may be part specific so as to conform to the shape of the laser shock peened surface 4 of the workpiece exemplified as the rotor blade 5 and made from a material transparent to a ND:YAG beam wavelength or other alternative laser beam wavelength. One such suitable material is Lexan. The conformal shape of the transparent wall 11 will direct the flow of the confining medium such as the water curtain 8 over the area to be LSP'D and assure both zero gap as well as greater than minimum depth.

The laser beam shock induced deep compressive residual stresses are produced by repetitively firing a high energy laser beam that is defocused ± a few mils with respect to the surface 4 which may or may not be covered with paint. The laser beam typically has a peak power density on the order of magnitude of a gigawatt/$cm^2$ and is fired through the transparent wall 11 of the confining means 9 and the curtain of water 8 that is flowed over the painted or unpainted surface 4. The paint or a small portion of the metal alloy material of the blade is ablated generating plasma which results in shock waves on the surface of the material. These shock waves are re-directed towards the surface 4 by the curtain of flowing water 8, or another fluid, to generate travelling shock waves; (pressure waves) in the material below the painted surface. The amplitude and quantity of these shockwave determine the depth and intensity of compressive stresses. Therefore, it is beneficial to control the thickness and the consistency of the curtain of flowing water 8. The paint is used to protect the target surface and also to generate plasma. Ablated paint material is washed out by the curtain of flowing water. In the case of the unpainted surface 4, a remelt will be left on the laser shock peened area after the laser shock peening or pulsing part of the process is completed and the remelt will usually have to be removed in any one of many well known processes such as by mechanical or chemical removing of the layer. The usefulness of a non-painted part with on the fly laser shock peening will depend on the thickness of the part and careful attention must particularly be given to thin parts such as thin airfoil leading and trailing edges.

The confining means 9 includes automated means illustrated as first robotic arms 18 upon each of which is mounted the transparent wall 11 and a water supply tube 19 connected to a water nozzle 20 which provides the water for the curtain of water 8. The first robotic arms 18 may be used to position transparent wall 11 and the water nozzle 20 from the surface 4. A distance sensor 22 may be used to provide measure and provide a signal indicating the gap S between the transparent wall 11 and the surface 4 to a controller 24. The controller 24 controls the movement of the first robotic arms 18 and can then use the signal to maintain a predetermined gap S.

If the laser beam 6 is fixed in position as illustrated herein then a second robotic arm 28 may used to move and position the rotor blade 5 to effect laser shock peening "on the fly". The laser may be fired sequentially "on the fly", as described in greater detail in U.S. patent Ser. No. 08/399,285, so that the laser shock peened surface 4 is laser shock peened with more than one sequence of painting the surface, if painting is used, and then continuously moving the blade while continuously firing the laser beam through the transparent wall 11 of the confining means 9 and the curtain of flowing water 8 on to the surface 4 such that adjacent laser shock peened circular spots are hit in different sequences.

Referring in greater detail to FIG. 2, the laser shock peening apparatus 1 illustrated herein includes a laser beam apparatus including a generator 31 having an oscillator and a pre-amplifier and a beam splitter which feeds the pre-amplified laser beam in to two beam optical transmission circuits each having a first and second amplifier 30 and 32, respectively and, focusing optics 36 that focus the laser beam 6 on the surface 4. The controller 24 may be used to modulate and fire the laser beam apparatus to fire the laser beam 6 on the surface 4 in a controlled manner. The water nozzle 20 flows water into a back pressure means for producing a back pressure in the curtain of water 8 over the surface 4. The back pressure means illustrated herein is a nozzle shaped wall section 38 of the transparent wall 11. The nozzle shaped wall section 38 is preferably, but not necessarily, integral with the transparent wall 11.

Figure 3:
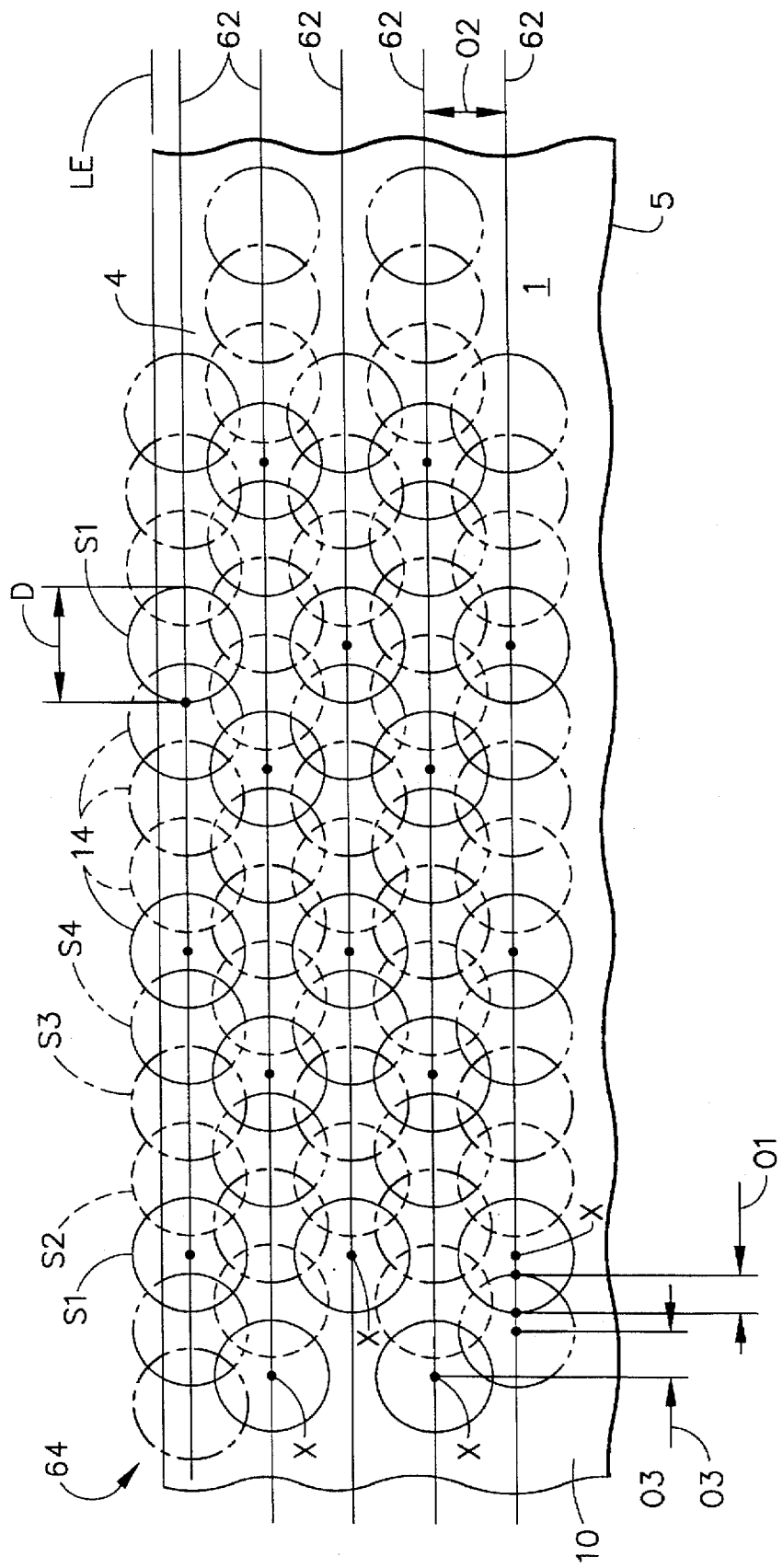
FIG. 3 is a schematic illustration of a pattern of laser shocked peened circular spots on a laser shock peened surface along a leading edge of a blade ELS in FIG. 1. illustrating an exemplary pattern having four sequences of laser shocked peened circular spots that don't overlap within a given sequence.

The invention is particularly useful for laser shock peening repetitive rows or repetitive offset rows, for which the laser is fired sequentially "on the fly", as illustrated in FIG. 3, for a fan rotor blade 5 so that the laser shock peened surface 4 is laser shock peened with more than one sequence of painting the surface (or not) and, then continuously moving the blade, while continuously firing the laser beam on the surface such that adjacent ones of the laser shock peened circular spots 14 are hit in different sequences. The illustrative pattern of the laser shock peened circular spots 14 (indicated by the circles) of four such sequences S1 through S4. The controller 24 may be used to modulate and sequentially fire the laser beam apparatus to sequentially fire the laser beam 6 on the surface 4 in a controlled manner and to control and actuate the first and second robotic arms 18 and 28 and to produce the sequences. The S1 sequence is shown as full line circles, as opposed to dotted line circles of the other sequences, to illustrate the feature of having non adjacent laser shock peened circular spots 14 with their corresponding centers X along a row centerline 62. The pattern of sequences entirely covers the laser shock peened surface 4. The laser shocked peened circular spots 14 have a diameter D in a row 64 of overlapping laser shock peened circular spots. The pattern may be of multiple overlapping rows 64 of overlapping shock peened circular spots on the laser shock peened surface 4. A first overlap is between adjacent laser shock peened circular spots 14 in a given row and is generally defined by a first offset O1 between centers X of the adjacent laser shock peened circular spots 14 and may for example vary from about 30%–50% or more of the diameter D. A second overlap is between adjacent laser shock peened circular spots 14 in adjacent rows and is generally defined by a second offset O2 between adjacent row centerlines 62 and again may for example vary from about 30%–50% of the diameter D depending on applications and the strength or fluency of the laser beam. A third overlap in the form of a linear offset O3 between centers X of adjacent laser shock peened circular spots 14 in adjacent rows 64 and may also for example vary from about 30%–50% of the diameter D depending on a particular application.

This method is designed so that only virgin or near virgin paint is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-painting of the laser shock peened surfaces 4 is done between each sequence of laser firings. The laser firing each sequence has multiple laser firings or pulses with a period between firings that is often referred to a "rep". During the rep, the part is moved so that the next pulse occurs at the location of the next laser shocked peened circular spot 14. Preferably, the part is moved continuously with the second robotic arm 28 and timed to be at the appropriate location at the pulse or firing of the laser beam. The first robotic arms 18 may be used to move the transparent wall 11 and the water supply tube 19 and the water nozzle 20 to place the confined curtain of water 8 to be at the appropriate location at the pulse or firing of the laser beam as well which could be very useful if the transparent wall 11 is conformal to the part such as the leading edge LE of the fan rotor blade 5. One or more repeats of each sequence may be used to hit each laser shocked peened circular spot 14 more than once. This may also allow for less laser power to be used in each firing or laser pulse.

One example of the present invention illustrated by FIG. 3 is a fan rotor blade 5 having an airfoil 10 about 11 inches long, a chordlength C about 3.5 inches, and laser shock peened surfaces 4 about 2 inches long along the leading edge LE. The laser shock peened surfaces 4 are about 0.5 inches wide (W1). A first row 64 of laser shocked peened circular spots 14 nearest the leading edge LE extends beyond the leading edge by about 20% of the laser spot diameter D which is about 0.27" thus imparting deep compressive residual stresses in the pre-stressed region 16 below the laser shock peened surfaces 4 which extend about 0.54 inches from the leading edge. Four sequences of continuous laser firings and blade movement are used. The firings between reps of the laser are done on spots 14 which lie on unabated painted surfaces which requires a repaint between each of the sequences. Each spot 14 is hit three times and, therefore, three sets of four sequences are used for a total of twelve paint and repaints of the laser shock peened surface 4.

Illustrated in FIG. 3 is an alternative embodiment of a laser shock peened process in accordance with the present invention. The process may be used to laser shock peen the entire leading edge as illustrated in FIG. 2 or a portion of the leading edge of the fan rotor blade 5 a shown in FIG. 2A using five rows of laser shock peened spots and covering the entire area of laser shock peened surfaces 4 in four sequences designated S1, S2, S3 and S4. The laser shock penning process starts with the first sequence where every four spots is laser shock peened on sequence S1 while the blade is continuously moved and the laser beam is continuously fired or pulsed and the laser. The part is timed to move between adjacent laser shock peened spots in the given sequence such as S1. The timing coincides with the rep between the pulses of the continuous laser firing on the blade. All five rows of the overlapping laser shocked peened circular spots 14 contain spots of each sequence spaced apart a distance so that other laser shock peened circular spots of the same sequence don't effect the paint around it. Sequence 1, preceded by a first painting, is shown by the complete or full circles in the FIG. 3 while the other laser shock peened spots such as in sequence S2, S3 and S4 are illustrated as dotted line, single dashed line, and double dashed line circles, respectively. Before the next sequence, such as between sequence S1 and sequence S2, the entire area of the laser shock peened surfaces 4 to be laser shock peened is repainted. This, procedure of repainting avoids any of the bare metal of the laser shock peened surface from being hit directly with the laser beam. For an area coverage of five rows with the spacing between rows and between adjacent spots of about 30%, it is found that one paint and three repaints will be necessary so that the part is actually painted four times in total which is somewhat of a time consuming process. It has been found desirable to laser shock peen a given part, such as a fan rotor blade, with between two and five rows. It has also been found desirable to laser shock peen each spot 14 up to 3 or more times. If each spot 14 is hit 3 times then 1 paint and 11 repaints is required for three sets of sequences S1–S4 for a total of 12 paintings.

It has been found that the part can be laser shock peened without any paint using on the fly laser shock peening which saves a considerable amount of time by not having to repaint. Furthermore, since it is often desired to laser shock peen each surface more than once and, in particular, three times. It is possible to save twelve paintings of the surface by laser shock peening without any paint at all. The laser shock peening without paint may use a lower laser beam fluency or use the same power level as with paint. The plasma that is created is made up of the metal alloy material of the blade or part itself. In such a case, a remelt will be left on the laser shock peened area after the laser shock peening or pulsing part of the process is completed. This remelt will usually have to be removed in any one of many well known processes such as by mechanical or chemical removing of the layer. The usefulness of a non-painted part with on the fly laser shock peening will depend on the thickness of the part and careful attention must particularly be given to thin airfoil leading and trailing edges. It has been found that two to five rows of laser shock spots without painting is a very useful number for fan and compressor blades. It should be noted that the plasma and the metal alloy without paint rehardens and forms what is known as a remelt and, therefore, will require a removal in one of the well known fashions.

The no paint "on the fly" laser shock peening process of the present invention forms the above mentioned plasma with metal alloy on the surface of the airfoil and a single continuous sequence of overlapping spots 14 may be used, as illustrated in FIG. 3, for as many rows as desired. After the laser shock peening process is done, the laser shock peened surface may be removed to a depth sufficient to remove the remelt that forms on the surface that might interfere with the airfoils operation.

Figure 4:
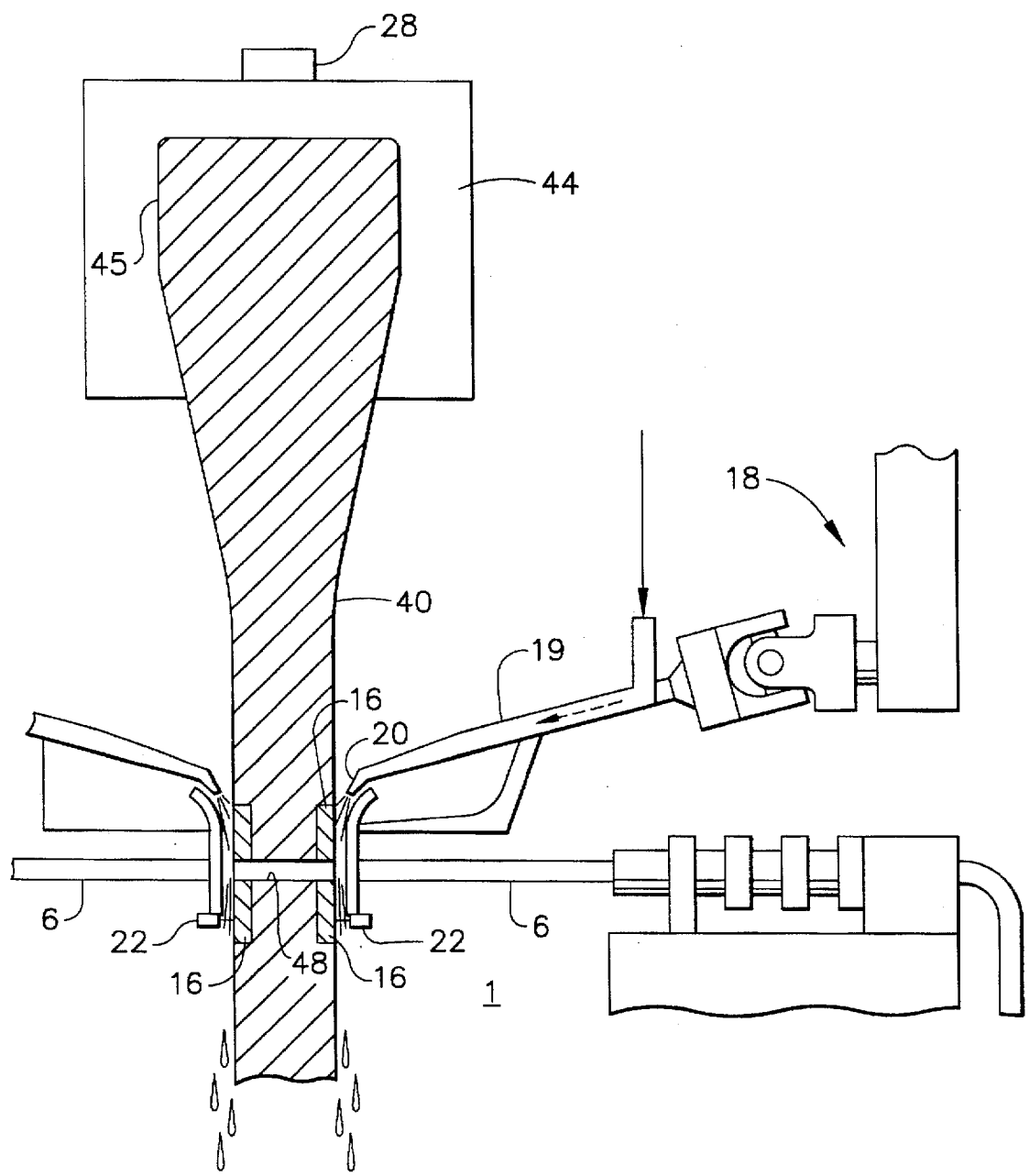
FIG. 4 is a partial perspective schematic illustration of the laser shock peening apparatus and method in accordance with an another exemplary embodiment of the present invention.

Another embodiment of the present invention may be used to laser shock peened annular surfaces, such as on a gas turbine rotor disk 40, as illustrated in FIG. 4. The second robotic arm 28 includes a rotatable grip 44 to secure and spin the disk by its hub 45 as well as move and position the rotor disk while the laser shock peening apparatus 1 is laser shock peening "on the fly". The laser may be fired sequentially "on the fly", as described in greater detail in U.S. patent Ser. No. 08/362,362 so that the laser shock peened surface 4 is laser shock peened with more than one sequence of painting the surface, if painting is used and, then continuously moving the blade, while continuously firing the laser beam through the transparent wall 11 of the confining means 9 and, the curtain of flowing water 8 on to the surface 4, such that adjacent laser shock peened circular spots are hit in the either the same or different sequences or rotations. This may be particularly useful for laser shock peening annular areas encompassing bolt holes 48 on the rotor disk 40 as is explained in greater detail in U.S. patent Ser. No. 08/319, 346. If a fixed laser beam 6 is used then the second robotic arm 28 can be tilted to produce a coning motion of the laser beam within the hole 48.

While the preferred embodiment of the present invention has been described fully, in order to explain its principles, it is understood that various modifications or alterations may be made to the preferred embodiment without departing from the scope of the invention as set forth in the appended claims.

I claim:

1. An apparatus for laser shock peening a surface portion on a workpiece through a curtain of water, said apparatus comprising:

a laser unit having at least one laser beam source for generating at least one laser beam and means for directing said beam through to the surface portion on the workpiece, a water supply means for flowing the curtain of water over the surface portion, a confining means for confining the water curtain on the surface portion essentially without any air gaps between the surface portion and a transparent wall of said confining means, said transparent wall being positionable a spaced apart distance from and over the surface portion, and said laser unit being of sufficient power to produce a region having deep compressive residual stresses imparted by laser shock peening extending into workpiece from the surface portion.

2. An apparatus as claimed in claim 1 wherein said confining means further comprises a back pressure means for producing a back pressure in the curtain of water over the surface portion.

3. An apparatus as claimed in claim 2 wherein said back pressure means comprises a nozzle shaped wall.

4. An apparatus as claimed in claim 3 wherein said nozzle shaped wall and said transparent wall are integral sections of a continuous water curtain confining wall.

5. An apparatus as claimed in claim 1 further comprising an automated means for positioning said confining means a predetermined distance away from the surface portion.

6. An apparatus as claimed in claim 5 wherein said confining means further comprises a back pressure means for producing a back pressure in the curtain of water over the surface portion.

7. An apparatus as claimed in claim 6 wherein said back pressure means comprises a nozzle shaped wall.

8. An apparatus as claimed in claim 7 wherein said nozzle shaped wall and said transparent wall are integral sections of a continuous water curtain confining wall.

9. An apparatus for simultaneously laser shock peening two surface portions on opposite sides of a workpiece through curtains of water said apparatus comprising:

a laser unit having at least one laser beam source for simultaneously generating and transmitting two laser beam and means for directing said beams through the curtains of water to the surface portion the workpiece, two water supply means for simultaneously flowing the curtains of water over the surface portions, and two confining means including transparent walls for confining each of the water curtains on each surface portion respectively and essentially without any air gaps between the surface portions and said transparent walls of said confining means, each of said transparent walls being positionable a spaced apart distance from and over one of the respective surface portions such that each surface portion can be simultaneously laser shock peened.

10. An apparatus as claimed in claim 9 further comprising an automated means for positioning said confining means a predetermined distance away from each respective surface portion.

11. An apparatus as claimed in claim 10 wherein said confining means further comprises back pressure means for producing a back pressure in each curtain of water over each respective surface portion.

12. An apparatus as claimed in claim 11 wherein each of said back pressure means comprises nozzle shaped walls.

13. An apparatus as claimed in claim 12 wherein each of said nozzle shaped walls and respective one of said transparent walls are integral sections of a continuous water curtain confining wall.

14. An apparatus as claimed in claim 12 further comprising a quick changeable pallet for holding the workpiece.

15. A method for laser shock peening a workpiece, said method comprising the following steps:

firing a laser beam with sufficient power to vaporize material on a surface portion of the workpiece to form a region having deep compressive residual stresses imparted by the laser shock peening process extending into the workpiece from the laser shock peened surface portion, flowing a curtain of water over the surface portion upon which the laser beam is firing while firing the laser beam, and using a confining means for confining the water curtain on the surface portion essentially without any air gaps between the surface portion and a transparent wall of the confining means, wherein the laser beam is fired through the transparent wall.

16. A method as claimed in claim 15, further comprising automatically positioning the transparent wall a spaced apart distance from and over the surface portion.

17. A method as claimed in claim 16, further comprising continuously moving the workpiece while continuously firing the laser beam, which repeatably pulses between relatively constant periods, on the workpiece until a predetermined area of the surface of the workpiece is completely covered by laser beam spots at least once.

18. A method as claimed in claim 17 wherein the laser shock peened surface is laser shock peened using a set of sequences wherein each sequence comprises painting the surface with a paint suitable to generate a plasma which results in shock waves to form the region having deep compressive residual stresses and then continuously moving the part while continuously firing a stationary laser beam on the surface such that adjacent laser shock peened circular spots are hit in different ones of said sequences in said set.

19. A method as claimed in claim 18 wherein each spot is hit more than one time using more than one set of said sequences.

20. A method as claimed in claim 17 wherein two oppositely facing surface portions on opposite sides of the workpiece are simultaneously laser shock peened.

* * * * *